Aug. 14, 1956  W. S. BRIAN  2,758,790
ELECTRONIC COUNTING TUBE AND CIRCUIT
Filed April 2, 1951  4 Sheets-Sheet 1
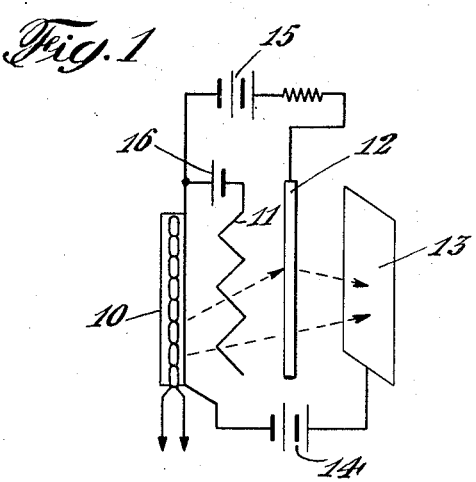
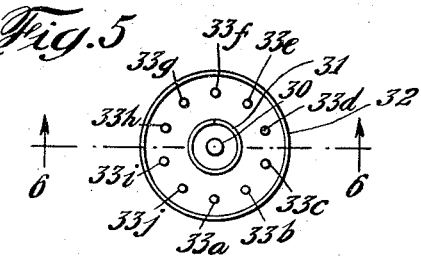
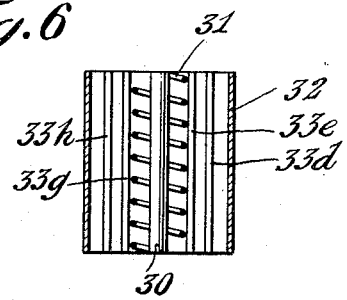
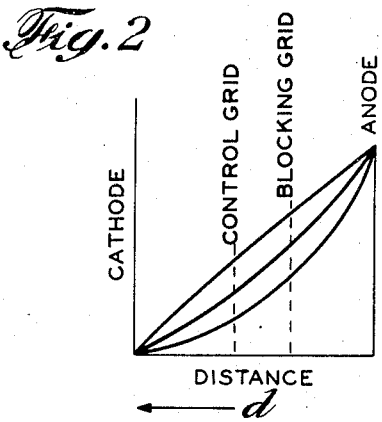
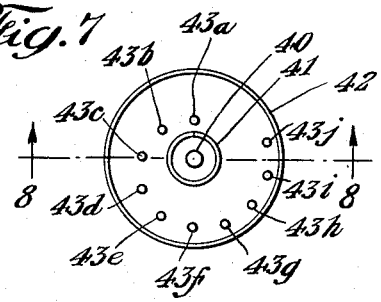
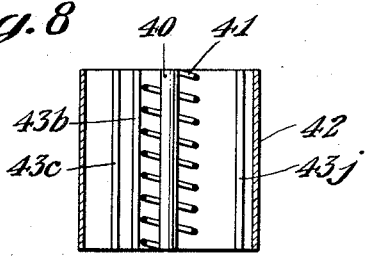
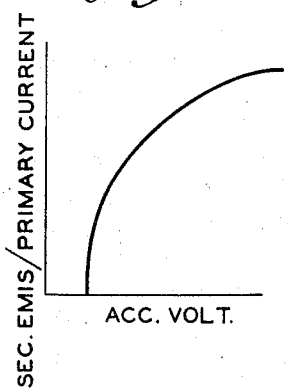
INVENTOR.
W. S. BRIAN
BY
Charles B. Smith
AGENT

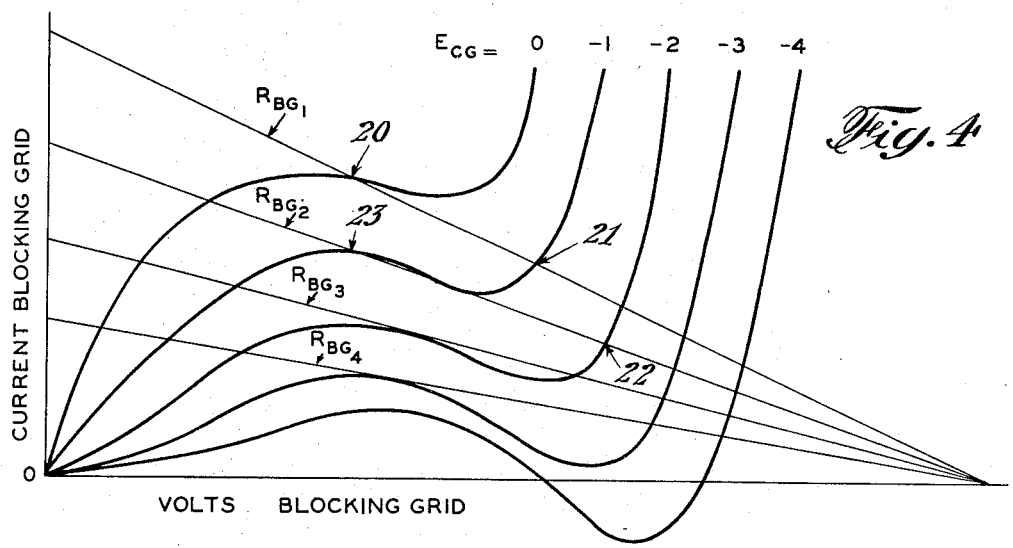
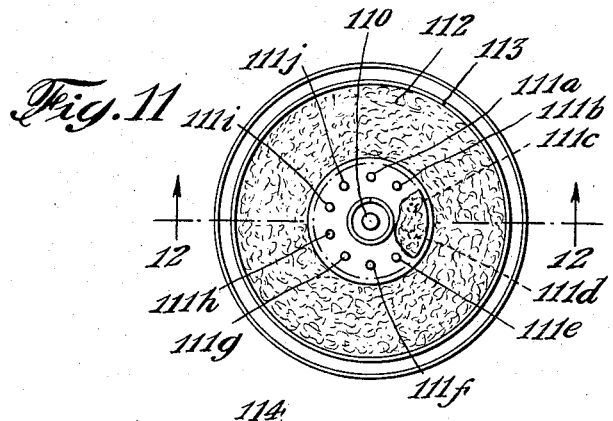
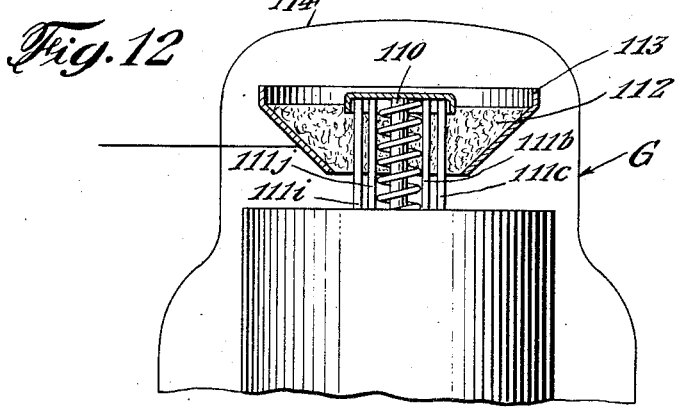

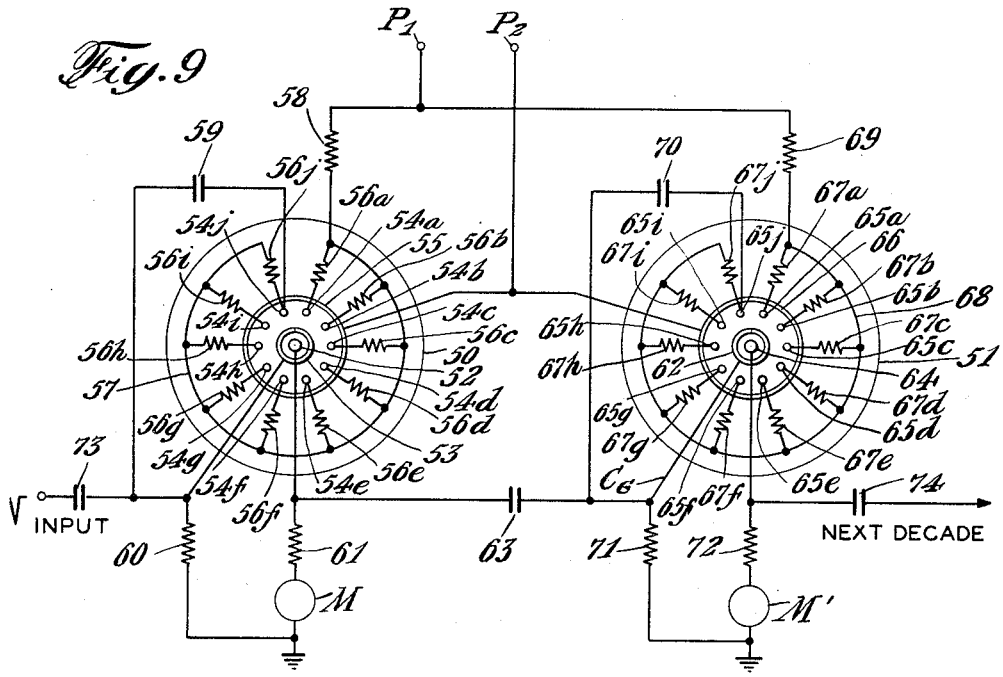
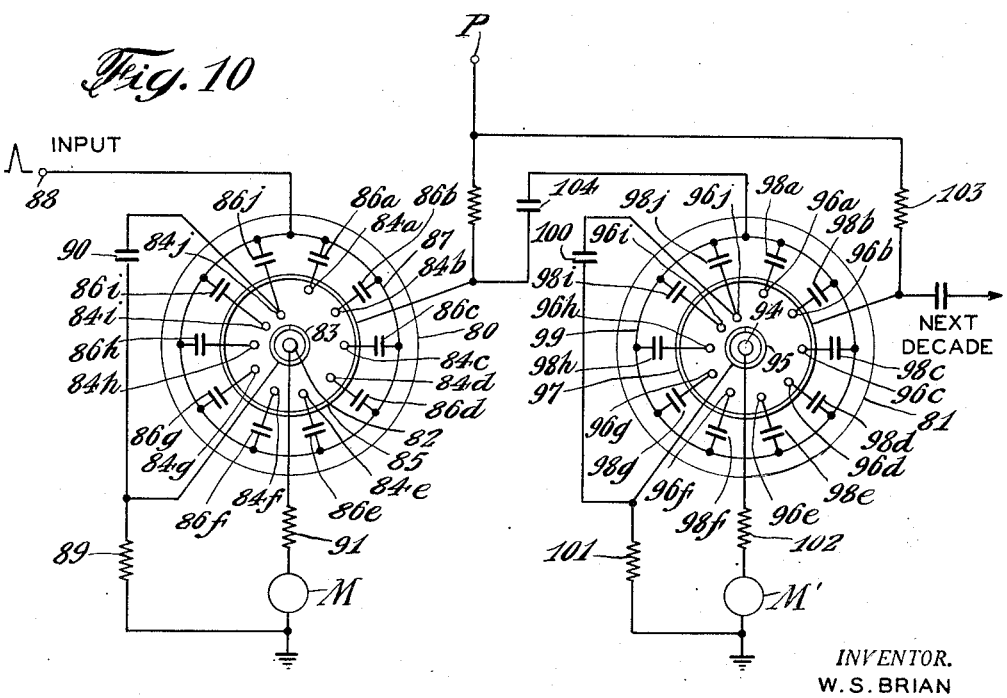

Aug. 14, 1956 W. S. BRIAN 2,758,790
ELECTRONIC COUNTING TUBE AND CIRCUIT
Filed April 2, 1951 4 Sheets-Sheet 4

INVENTOR.
W. S. BRIAN
BY
Charles B. Smith
AGENT

United States Patent Office 2,758,790
Patented Aug. 14, 1956

2,758,790

ELECTRONIC COUNTING TUBE AND CIRCUIT

William Stanley Brian, Northport, N. Y., assignor to Hanson-Gorrill-Brian, Inc., Glen Cove, N. Y., a corporation of New York Application April 2, 1951, Serial No. 218,839

18 Claims. (Cl. 235—92)

The present invention relates to electronic stepping and more particularly to counting or computing circuits and electronic discharge stepping devices therefor.

For many purposes it is desirable to employ counting devices for indicating and registering the number of occurrences of particular phenomena. Examples of such applications are numerous and include, for example, mileage indicators and adding machines.

Mechanical counting and registering systems are widely known. For instance, in the so-called "Geneva movement," a mechanical displacement representative of information elements provides an advance of an escapement mechanism. Upon reaching a fixed digit of advance, for example, 10 in decade counting, a succeeding mechanically coupled escapement is advanced by one position. The original escapement then returns to its original position, and upon reaching the fixed digit a second time, the second escapement advances to a second position. It is possible to add any number of succeeding escapement stages in tandem to increase the maximum number of information elements that can be indicated.

It is also known to provide electrical means for performing the same operation. For instance, in U. S. Patent 2,473,159, issued June 14, 1949, to H. T. Lyman, Jr., there is disclosed an arrangement comprising a plurality of electrical counting stages intercoupled by means of transfer stages.

The principal object of the present invention is to provide an electronic counting system suitable for high-speed counting.

More particularly, it is an object of the invention to provide a high-speed counting tube and circuit therefor.

Another object of the invention is to provide an electronic stepping device responsive to applied electrical impulses.

Still another object of the invention is to provide an electronic counting tube in which the stored count may be directly observed.

Further objects of the invention will appear from the following description.

Information is prepared for counting by the circuits of the invention by reduction to the form of voltage pulses, each pulse being representative of an element of information to be counted by the system. In accordance with the invention, the voltage pulses are applied to a cyclic stepping or counting system comprising one or more counter tubes each included in a counting circuit. The counter tubes according to the invention have novel internal structures which will be described in greater detail hereinafter. These tubes may also be termed "blocking grid tubes." Each counter tube and its associated circuit elements may be termed a "counting stage." In decimal systems of counting, it will be convenient to arrange the counter stages in decade relationship. It is the duty of each counter stage to indicate and store the count of each applied pulse and to provide a stepping pulse for the succeeding stage. Assuming, for purposes of illustration only, a decade relationship, the first counter stage must indicate and store the first ten pulses applied thereto, each pulse being representative of an element of information. Upon application of the tenth pulse, the first counter stage must generate a pulse for energization of the succeeding stage and return to its normal condition of zero count. The second stage operates in the same way as the first stage, except that the input pulses applied thereto are derived from the preceding stage and are representative of ten elements of information. Additional stages would operate in the same way except that they would have applied thereto pulses representative of a hundred, a thousand, etc. elements of information. Of course, other counting relationships besides decade could be employed.

In accordance with the invention, the counter tubes are provided with a plurality of secondarily emissive electrodes inserted in the discharge path between the cathode and anode electrodes. For convenience, these secondarily emissive electrodes will be termed "blocking grids." The secondary emissive characteristics of the blocking grid electrodes are manipulated to provide stepped variations in the cathode current responsive to voltage pulses representative of the information elements to be counted.

The counting and computing circuits and tubes according to the invention to not possess the speed limitations inherent in mechanical escapement or Geneva movements. Since the maximum speed of counting in the arrangement of the invention is determined primarily by electron transit time between cathode and anode electrodes, very high counting speeds may be achieved.

The invention will now be described in greater detail with reference to the appended drawing in which:

Fig. 1 is a theoretical representation of a portion of an electron discharge tube according to the invention;

Fig. 2 is a graphical representation of a family of voltage distribution curves for the tube of Fig. 1a;

Fig. 3 is a graphical representation of secondary emissive ratio;

Fig. 4 is a graphical representation of a family of characteristic curves for the tube of Fig. 1a;

Figs. 5 and 6 illustrate one form of electron discharge tube in accordance with the invention;

Figs. 7 and 8 illustrate another form of electron discharge tube in accordance with the invention;

Fig. 9 illustrates a two-stage decade counting circuit employing a tube of the type shown in Figs. 2a and 2b;

Fig. 10 illustrates a two-stage decade counting circuit employing a tube of the type shown in Figs. 3a and 3b;

Figs. 11 and 12 illustrate a portion of an electron discharge tube according to the invention in which a direct indication of count may be observed on a fluorescent screen;

Figure 13:
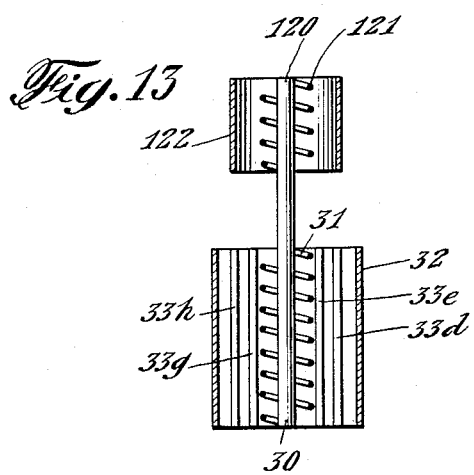
Fig. 13 illustrates a modified counting tube in accordance with the invention.

Referring now to the drawing, and more particularly to Fig. 1, there is illustrated an electron discharge tube having a cathode 10, a control grid 11, a blocking grid 12 and an anode 13. Anode 13 and blocking grid 12 are maintained at positive potentials with respect to cathode 10 by means of batteries 14 and 15, respectively. Control grid 11 is maintained at a negative potential with respect to cathode 10 by means of a battery 16.

Figure 2 shows three curves of potential distribution between cathode 10 and anode 13. The straight line shows the potential distribution with no current flowing, while the other two curves show how the potential distribution changes as the cathode-anode current is increased.

Figure 3 shows a dimensionless plot of the ratio of secondary emission to primary current of blocking grid 12 with respect to the accelerating voltage applied thereto. As is apparent from Fig. 3, secondary emission from blocking grid 12 does not begin until a low positive voltage is applied thereto. The ratio then increases rapidly through a middle voltage range and decreases at higher accelerating voltages.

Figure 4 shows a family of curves of blocking grid current versus blocking grid voltage at different values of control grid voltage and with the anode at a higher positive potential than the blocking grid. The decrease in blocking grid current occurring as the blocking grid voltage is raised is caused by the flow of secondary electrons from blocking grid 12 to anode 13. The blocking grid current in each curve of Fig. 4 goes through a minimum and then increases again. This is due to the fact that, as the voltage on the blocking grid increases, it passes above the potential of the surrounding space as shown in Fig. 2. When the potential of blocking grid 12 exceeds that of the surrounding space, emitted secondary electrons tend to return to blocking grid 12 rather than proceed to anode 13. If blocking grid 12 were spaced closer to anode 13, the current minimum would occur at a higher blocking grid voltage. It is also apparent from Fig. 4 that spacing blocking grid 12 closer to anode 13 would result in the minimum blocking grid current having a lower absolute value. It can also be seen from Fig. 4 that, as the control grid voltage $E_{cg}$ is made more negative, the first positive current maxima occur at lower absolute current values. In other words, increasing the negative control grid bias increases the impedance of the blocking grid circuit without changing its general shape.

In Figure 4, lines $R_{bg}1$ through $R_{bg}4$ represent load lines for increasing values of blocking grid circuit resistance. Line $R_{bg}1$ intersects curve $E_{cg}0$ at a point 20. This represents the voltage at which blocking grid 12 will operate under these circuit parameters. If the control grid voltages is now increased to $-1.0$ volts, the current maximum will occur below the $R_{bg}1$ load line and the blocking grid voltage will immediately rise to the value indicated at point 21, which is the point of intersection of load line $R_{bg}1$ with curve $E_{cg}-1$. At this point the blocking grid becomes "blocked," i. e, the blocking grid voltage varies so rapidly with negative increases in control grid voltage as to maintain the anode current substantially constant and independent of increases in negative control grid bias. If the load resistance were increased to a value corresponding to curve $R_{bg}2$, a still higher control grid bias, $E_{cg}-2$, would be required to allow blocking grid 12 to block. This potential is indicated by point 22, which is the intersection of curve $E_{cg}-2$ and load line $R_{bg}2$. Once the blocking condition is achieved, that is, when blocking grid 12 assumes a potential corresponding to a point such as 21 or 22, a negative increase in grid bias will have relatively little effect on anode current because of the relatively large increase resulting in blocking grid potential. If the control grid voltage is returned to zero, the blocking grid voltage will return to a value corresponding to point 20 for a load resistance of $R_{bg}1$ or to a point 23 for a load resistance of $R_{bg}2$.

If a plurality of blocking grids are provided in a tube instead of the single blocking grid 12 of Fig. 1, they can be caused to block one at a time by providing each blocking grid circuit with a different resistance value and varying the control grid bias in discrete steps, each step being sufficient to cause a blocking grid to block. The different resistance values of the blocking grid circuits may be realized in different ways. For instance, different physical resistance values may be interposed between the various blocking grids and the source of positive blocking grid potential. Another suitable method employs the effective increase in blocking grid circuit impedance as the blocking grid is spaced closer to the anode. More specifically, each blocking grid may be spaced a different distance from the anode, thereby effectively providing a different impedance in each blocking grid circuit.

A suitable electron discharge tube according to the invention is shown in Figs. 5 and 6. Fig. 6 is a section of Fig. 5 taken along a line 6—6. The tube comprises a cathode 30, a control grid 31, an anode 32 and a plurality of blocking grids 33a through 33j. Blocking grids 33a through 33j comprise rod-like electrodes interposed between control grid 31 and anode 32 and each spaced a like radial distance from anode 32. The blocking grids 33 may be caused to block at different values of control grid voltage by connecting resistance elements having different values to respective ones of the blocking grids. A suitable counting circuit for use with this tube and showing the connections of the resistance elements to the respective blocking grids will be described hereinafter in connection with Fig. 9.

Another suitable electron discharge tube according to the invention is illustrated in Figs. 7 and 8. Fig. 8 is a section of Fig. 7 taken along a line 8—8. This tube comprises a cathode 40, a control grid 41, and anode 42 and a plurality of rod-like blocking grids 43a through 43j interposed between control grid 41 and anode 42. Each of the blocking grids 43 is disposed a different radial distance from anode 42. Blocking grids 43 are caused to float at potentials determined primarily by the potential distribution within the tube. As shown in Fig. 2, this potential increases from the cathode to the anode, so that the blocking grids will tend to assume potentials proportional to their respective radial spacings from cathode 40. Each of the blocking grids 43 has a different impedance value, blocking grid 43a, the one closest to the cathode, having the lowest impedance value and blocking grid 43j, the one closest to the anode, having the highest impedance value. If blocking grids 43 are disposed, relative to each other, in spiral formation, the variations in impedance between adjacent blocking grids may be made substantially uniform. A suitable counting circuit for use with the tube of Figs. 7 and 8 will be described hereinafter in connection with Fig. 10.

While the tubes of Figs. 5 through 8 are shown as having ten blocking grids each, any other number, consistent with limitations of space, could be used. Ten blocking grids have been chosen for the purposes of illustration because this number would be necessary for decade counting.

Referring now to Fig. 9, there are shown two electron discharge tubes 50 and 51, each corresponding to the tube illustrated in Fig. 2. Tube 50 comprises a cathode 52, a control grid 53, ten blocking grids 54a through 54j and an anode 55. To each of the blocking grids 54 connected respective resistance elements 56a through 56j. Each of the resistance element 56 has a different resistance value, the values increasing respectively from element 56a to element 56j. The free ends of resistance elements 56 are interconnected by a conductor 57 which is connected to a source of positive potential P1 through a resistor 58. Blocking grid 54j is coupled to control grid 53 through a capacitor 59. Control grid 53 is coupled to ground through a resistor 60. Cathode 52 is provided with a biasing potential through a cathode resistor 61 intercoupling cathode 52 and ground. A current meter M is interposed between the end of resistor 61 remote from cathode 52 and ground.

Cathode 52 is coupled to a control grid 62 of tube 51 through a coupling capacitor 63. Tube 51 comprises a cathode 64, control grid 62, blocking grids 65a through 65j, anode 66, resistance elements 67a through 67j and conductor 68. The connections of the various elements of tube 51 correspond to the connections of corresponding elements of tube 50. Conductor 68 is coupled to potential source P1 through a resistor 69. Blocking grid 65j is coupled to control grid 62 through a capacitor 70. Control grid 62 is coupled to ground through a resistor 71, while cathode 64 is coupled to ground through resistor 72 and a current meter M'. Anodes 55 and 66 are interconnected and connected to a source of positive potential P2 having a voltage higher than that of source P1.

While tubes 50 and 51 have been illustrated as having the blocking grid resistors disposed within their respective envelopes, they may conveniently be located outside the envelopes.

As indicated in connection with Figs. 5 and 6, the respective potentials of the blocking grids, for high values of blocking grid resistors, are determined primarily by a combination of the space potential, the supply voltage, and the respective blocking grid resistor values.

The normal or rest conditions of the blocking grids of tubes 50 and 51 are at points on the characteristic curves corresponding to the intersections of the respective blocking grid resistor load lines of Fig. 4 with the $Ecg0$ curve. For instance, if one of the blocking grids has a resistor of the value $Rbg1$ connected thereto, the rest operating point would be point 20 because this is the point of intersection of load line $Rbg1$ with curve $Ecg0$. In order to cause the blocking grids of tubes 50 and 51 to block, a train of negative signal pulses is applied to control grid 53 through a capacitor 73. If the magnitude of the applied pulse is adjusted properly, application of the first pulse will cause the blocking grid with the smallest resistance value, i. e., blocking grid 56a, to block. When rod 56a blocks, anode current starts to flow and establishes a negative control grid bias by means of the voltage drop across cathode resistor 61. Control grid 53 is, therefore, maintained at a fixed negative bias, such that blocking grid 56a remains blocked. None of the other blocking grids will conduct, however, because the resistances coupled thereto are higher than that coupled to blocking grid 56a. The next negative pulse applied to control grid 53 will cause the blocking grid with the next highest value of resistance coupled thereto, i. e., blocking grid 56b, to block. When blocking grid 56b blocks, the anode current of tube 50 will increase, thereby increasing the negative control grid bias thereof and preparing the tube for the next negative pulse. Each negative pulse will cause an additional blocking grid to block until all ten are in a blocked condition.

The positive excursion of the last blocking grid, 56j, as it assumes the blocked condition, is repeated at control grid 53 through capacitor 59 as a positive peak which returns control grid 53 substantially to zero potential, causing unblocking of each of the blocking grids. The unblocking phenomenon upon decrease in negative control grid bias was explained hereinbefore in connection with Fig. 4. Unblocking of the blocking grids will suppress current flow in tube 50, thereby eliminating the bias voltage across cathode resistor 61 and returning the tube to its initial unenergized condition.

As an example, when no negative signal is applied to control grid 53, the total cathode current will be very small, since the anode current will be low due to the low blocking grid voltage. Hence, the residual bias through the cathode resistor will be small, for instance, of the order of ¼ volt. If a negative signal such as —1 volt is applied to grid 53, the total grid bias will be about —1¼ volts, and the blocking grid connected through the resistor corresponding to $Rbg1$ will assume some positive voltage slightly beyond the point 21. This large increase in blocking grid voltage will produce a large increase in the anode current in the anode region behind this blocking grid. This increase in anode current will maintain a cathode bias of about —1 volt, and will cause the blocking grid connected through $Rbg1$ to remain approximately at the point 21 on the characteristic curve. The blocking grid connected through $Rbg2$ will move to the point 23. At this point this blocking grid will not have advanced enough in voltage to materially increase the anode current in the section of the anode directly behind it.

When a second grid pulse of about —1 volt is applied to control grid 53, the total control grid voltage will be about —2¼ volts and the blocking grid connected through $Rbg2$ will rise in voltage to the point 22, at which time the anode current in the section of the anode behind this blocking grid will be greatly increased, and the total cathode current will maintain the grid bias at approximately —2 volts. This progressive increase in cathode current will occur with each pulse applied to control grid 53 until all 10 blocking grids have assumed their blocked conditions. The tenth pulse will supply a pulse to the control grid of the second counter tube which will in turn feed back to the first counter tube a pulse to control grid 53. This positive pulse will return the control grid 53 approximately to zero potential and cause all of the blocking grids to assume their unblocked conditions.

As each blocking grid was caused to block, the anode current of tube 50 increased a discrete amount. The anode current flowing through the anode circuit may, therefore, be considered as a measure of the number of blocking grids that have been caused to block, or the number of negative pulses applied to control grid 53. Meter M in the cathode circuit of tube 50 will indicate the anode current and, if calibrated in terms of digits, the actual count of negative pulses applied to control grid 53 up to a maximum of ten. Of course, an increase or decrease in the number of blocking grids will result in a corresponding increase or decrease in the maximum number of counts observable.

After ten negative pulses have been applied to control grid 53, tube 50 is cut off as indicated hereinbefore. The voltage across cathode resistor 61 will, therefore, exhibit a negative excursion which will be repeated at control grid 63 of tube 51 through coupling capacitor 63. This repeated excursion serves as a first negative pulse at grid 62 to cause blocking grid 65a to block. Tube 51 responds to negative grid pulses in the same manner as tube 50, so that blocking of blocking grid 65a will prepare the tube for the next negative pulse at control grid 62. The next negative pulse at control grid 62 will be applied thereto after 10 more negative pulses have been applied to control grid 53. That this is the case can be seen from the fact that every tenth negative pulse applied to grid 53 returns tube 50 to its cut-off or normal condition.

It is evident that the 100th pulse applied to control grid 53 will cause blocking grid 65j of tube 51 to block, returning tube 51 to its cut-off or normal condition. Meter M' in the cathode circuit of tube 51 responds to changes in anode current thereof. However, a change in reading of meter M' of the same magnitude as that of meter M will correspond to ten negative pulses at grid 53. The counting circuit described is of the decade type. The actual number of negative pulses received at any instant of time may be determined by reading meters M and M' in decade relationship. Further counts may be indicated by coupling additional stages in tandem. This is indicated in Fig. 9 where capacitor 74 would be coupled to the control grid of the next blocking grid tube. The operation of the next stage, if any, would correspond to the operation of tube 51 in the same way that the operation of tube 51 corresponds to the operation of tube 50.

For many counting applications, a current meter proves to be an inconvenient indicating device. Another method of indicating the count will be described hereinafter in connection with Figs. 11 and 12.

In Fig. 10 there are shown two electron discharge tubes 80 and 81, each corresponding to the tube illustrated in Figs. 7 and 8. Tube 80 comprises a cathode 82, a control grid 83, ten blocking grids 84a through 84j and an anode 85. Ten capacitors 86a through 86j are coupled, respectively, to blocking grids 84a through 84j. The free ends of capacitors 86 are interconnected by a conductor 87. Conductor 87 is connected to input terminal 88. Control grid 83 is coupled to ground through a resistor 89 and to blocking grid 84j through a capacitor 90. Cathode 82 is coupled to ground through a cathode resistor 91 and a current meter M. Anode 85 is coupled to a source of positive potential P through an anode resistor 93.

Blocking grids 84a through 84j are disposed between control grid 83 and anode 85. Each of the blocking grids 84 is located a different radial distance from the cathode. Blocking grids 84 are arranged in spiral formation with blocking grid 84a located nearest anode 85 and blocking grid 84j located nearest control grid 83. With respect to direct currents, the blocking grids are effectively isolated from external potentials and hence will tend to assume potentials determined by the potential distribution within the tube.

A positive voltage pulse applied to input terminal 88 will be applied to each of blocking grids 84 through their respective capacitors 86 and will tend to cause each of the blocking grids to block, i. e., assume and maintain a higher positive potential. If the positive pulse applied to terminal 88 is properly chosen, only the blocking grid having the highest impedance value, i. e., the one closest to anode 85, will block. This is blocking grid 84a. When blocking grid 84a blocks, anode current will start to flow and will produce a bias voltage across cathode resistor 91. The presence of this biasing voltage will shift the operating point on the tube characteristics so that the next positive pulse applied to terminal 88 will cause blocking grid 84b to block, again increasing the anode current and the biasing potential. Each additional pulse causes an additional grid to block until all the blocking grids have blocked. The positive voltage excursion of blocking grid 84j as it blocks upon application of the tenth pulse to terminal 88 is repeated at control grid 83 through capacitor 90, raising the control grid potential substantially to its initial value. As soon as the control grid bias is overcome, all of the blocking grids unblock and the tube is returned to its initial or rest condition. The sudden decrease in anode current occasioned by unblocking of the blocking grids will produce a sharp rise in the potential of anode 85. If the circuit parameters are properly chosen, the rise in anode potential can be made substantially equivalent in shape and amplitude to the pulses applied to terminal 88.

Similarly, as in Fig. 9, changes in tube current attendant on each application of a pulse to terminal 88 will result in a changed reading of current meter M.

Tube 81, which may be identical to tube 80, comprises a cathode 94, a control grid 95, ten blocking grids 96a through 96j arranged in spiral formation and an anode 97. Ten capacitors 98a through 98j each have one terminal thereof connected to a respective one of blocking grids 96 and their other terminals interconnected by a conductor 99. Control grid 94 is coupled to blocking grid 96j through a capacitor 100 and to ground through a resistor 101. Cathode 94 is coupled to ground through a cathode resistor 102 and a current meter M'. Anode 97 is coupled to potential source P through a resistor 103.

The sharp rise in anode voltage of tube 80 upon application of the tenth pulse to terminal 88 is repeated at each of blocking grids 96 through a coupling capacitor 104 and through the respective isolating capacitors 98. Each tenth pulse applied to terminal 88 will cause a pulse to be applied to the blocking grids of tube 81. Since tube 81 operates in the same manner as tube 80, application of a hundred pulses to terminal 88 will cause all ten blocking grids of tube 81 to block, returning tube 81 to its normal unoperated condition and producing a positive voltage pulse at anode 97 which may be applied to an additional decade stage, if any, through a coupling capacitor 104. Meter M' in the cathode circuit of tube 81 will register changes in tube current of tube 81, so that each tenth pulse applied to terminal 88 will produce a change in indication of meter M'. Similarly, as in Fig. 9, the blocking grid tubes could easily be designed for counting other than decade relationships. This might be done by providing a different number of blocking grids or by using less than the maximum number of blocking grids. Furthermore, capacitors 86 and 98 and conductors 87 and 99 could conveniently be located outside the tube envelopes.

Referring now to Figs. 11 and 12, there is illustrated the upper portion of a blocking grid tube arranged to indicate directly the number of pulses applied thereto. Fig. 12 is a section of Fig. 11 taken along a line 12—12. The tube of Figs. 11 and 12 corresponds generally with the tube of Figs. 5 and 6. Rod 110 is an extension of the cathode, while rods 111a through 111j are extensions of the blocking grid electrodes. A fluorescent target 112 is arranged around the cathode and blocking grid electrodes. A light shield 113 is arranged around the outer surface of fluorescent target 112 to direct the light therefrom towards upper surface 114 of envelope G. Rod extensions 111a through 111j, which have the same potentials as the blocking grids to which they are respectively connected, control the flow of current from cathode extension 110 to fluorescent target 112. Target 112 is connected to a source of positive potential B+ in order to attract electrons from cathode extension 110. When the various blocking grids are caused to block, as explained hereinbefore, current is permitted to flow to the fluorescent target, producing illumination in portions of the target adjacent to the blocked blocking grid extensions corresponding to the blocked blocking grids. A first pulse applied to the tube causes one section of the fluorescent target to be illuminated. Additional pulses cause additional sections to be illuminated, until ten sections are illuminated upon application of a tenth pulse. When the blocking grids unblock, current can no longer flow from the cathode, and the fluorescent target ceased to be illuminated. In this way the fluorescent target, as viewed from surface 114, indicates directly the number of pulses applied to the tube. If the tube is not in the first decade, the number of fluorescent target sections illuminated will correspond to the number of pulses applied in accordance with the relationship of the particlular decade in which it is located. If a current meter is also included in the tube cathode circuit, an additional indication of the count is also provided.

A tube of the type illustrated in Figs. 7 and 8 could also be provided with a fluorescent target. In this event, the rod extensions 111a through 111j of Figs. 11 and 12 would be arranged in spiral formation.

If the blocking grid current exhibits a negative excursion, as shown in curve Ecg-4 of Fig. 4, then the blocked grids may not be unblocked by returning the control grid to ground potential. In other words, if the blocking grid circuit resistance is so high that a curve with a negative current excursion is encountered before blocking will occur, then blocking grids having this high value of resistance will not unblock by returning the grid to zero potential unless the blocking grid supply voltage is dropped to a point below that corresponding to the most negative excursion of the blocking grid current.

A counting tube, in accordance with the invention, in which the requisite momentary drop in blocking grid supply voltage is provided is shown in Fig. 13. The lower portion of the tube illustrated in Fig. 13 may be identical with the tube shown in Fig. 6. However, the upper portion is a triode section having a cathode 120 constituting an extension of cathode 30. In addition, the upper section includes a triode grid 121 and a triode anode 122.

Figure 14:
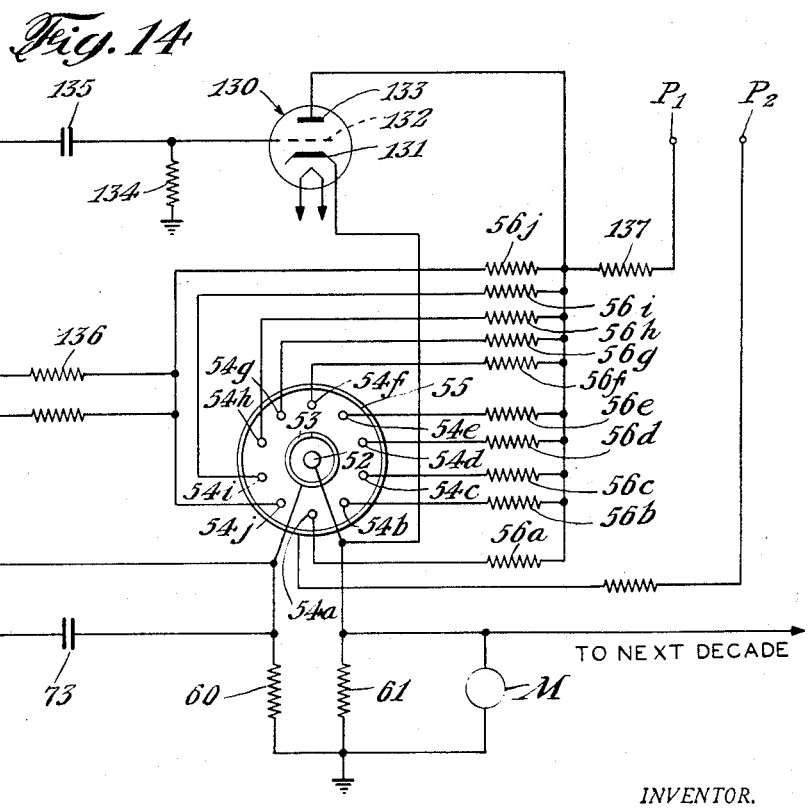
Fig. 14 shows a counting circuit for use with the tube of Fig. 13.

In Fig. 14, there is shown a counting circuit employing the tube of Fig. 13. Of course, in Fig. 14 a separate triode tube could be used. Fig. 14 corresponds generally with one of the tubes and circuits of Fig. 9. However, there is added a triode section 130 having a cathode 131, a control grid 132 and an anode 133. Control grid 132 is coupled to ground through a resistor 134 and to blocking grid 54*j* through a capacitor 135 and a resistor 136. Anode 130 is coupled to a source of positive potential P1 through a resistor 137. Negative bias for triode 130 is provided by the voltage drop across resistor 61.

When the tenth negative pulse is applied to control grid 53, blocking grid 54*j* is caused to block. The excursion of blocking grid 54*j* potential is repeated at control grid 53 through capacitor 59 and at control grid 132 through capacitor 135. The positive pulse appearing at grid 132 causes the anode impedance of tube 130 to fall and effectively short-circuit the blocking grid resistors 56*a* through 56*j*. In this way, unblocking can be effected irrespective of negative blocking grid current excursions, and a counting tube can be used over a more extended blocking grid voltage range.

While the invention has been described in specific embodiments thereof and in specific uses, various modifications thereof will occur to those skilled in the art without departing from the spirit and scope of the invention as set forth in the appended claims.

What is claimed is:

1. A counting device comprising a cathode, a control grid disposed about said cathode, an anode disposed about said control grid and a plurality of secondarily emissive blocking grid electrodes disposed between the control grid and the anode and each being included in a respective circuit having a different first effective load impedance value at which, for first predetermined values of control grid-cathode potential and first respective predetermined values of blocking grid-cathode potential, the respective blocking grids will assume a normal unblocked condition thereof in which each blocking grid substantially suppresses a respective portion of anode current flow, each of said blocking grid circuits having a second and substantially infinite load impedance value at which, for second respectively different values of control grid-cathode potential and second respective values of blocking grid-cathode potential, the respective blocking grids will each assume a blocked condition thereof in which it permits the flow of its respective portion of anode current flow in an amount substantially independent of further negative excursions of control grid-cathode potential.

2. A counting device comprising a cathode, a control grid disposed about said cathode, an anode disposed about said control grid and a plurality of secondarily emissive rod-like blocking grid electrodes disposed between the control grid and the anode and each being included in a respective circuit having a different first effective load impedance value at which, for first predetermined values of control grid-cathode potential and first respective predetermined values of blocking grid-cathode potential, the respective blocking grids will assume a normal unblocked condition thereof in which each blocking grid substantially suppresses a respective portion of anode current flow, each of said blocking grid circuits having a second and substantially infinite load impedance value at which, for second respectively different values of control grid-cathode potential and second respective values of blocking grid-cathode potential, the respective blocking grids will each assume a blocked condition thereof in which it permits the flow of its respective portion of anode current flow in an amount substantially independent of further negative excursions of control grid-cathode potential, the second respectively different values of control grid-cathode potential being more negative, respectively, than the first predetermined values of control grid-cathode potential.

3. A counting device comprising a cathode, a control grid disposed about said cathode, an anode disposed about said control grid and a plurality of secondarily emissive rod-like blocking grid electrodes disposed in substantially circular formation at a given radial distance between the control grid and the anode and each being included in a respective circuit having a different first effective load impedance value at which, for first predetermined values of control grid-cathode potential and first respective predetermined values of blocking grid-cathode potential, the respective blocking grids will assume a normal unblocked condition thereof in which each blocking grid substantially suppresses a respective portion of anode current flow, each of said blocking grid circuits having a second and substantially infinite load impedance value at which, for second respectively different values of control grid-cathode potential and second respective values of blocking grid-cathode potential, the respective blocking grids will each assume a blocked condition thereof in which it permits the flow of its respective portion of anode current flow in an amount substantially independent of further negative excursions of control grid-cathode potential.

4. A counting device comprising a cathode, a control grid disposed about said cathode, an anode disposed about said control grid and a plurality of secondarily emissive rod-like blocking grid electrodes disposed in substantially spiral formation at respectively different radial distances between the control grid and the anode and each being included in a respective circuit having a different first effective load impedance value at which, for first predetermined values of control grid-cathode potential and first respective predetermined values of blocking grid-cathode potential, the respective blocking grids will assume a normal unblocked condition thereof in which each blocking grid substantially suppresses a respective portion of anode current flow, each of said blocking grid circuits having a second and substantially infinite load impedance value at which, for second respectively different values of control grid-cathode potential and second respective values of blocking grid-cathode potential, the respective blocking grids will each assume a blocked condition thereof in which it permits the flow of its respective portion of anode current flow in an amount substantially independent of further negative excursions of control grid-cathode potential.

5. A counting and indicating device comprising a cathode, a control grid disposed about said cathode, an anode disposed about said control grid, a plurality of secondarily emissive rod-like blocking grid electrodes disposed between the control grid and the anode and each being included in a respective circuit having a different first effective load impedance value at which, for first predetermined values of control grid-cathode potential and first respective predetermined values of blocking grid-cathode potential, the respective blocking grids will assume a normal unblocked condition thereof in which each blocking grid substantially suppresses a respective portion of anode current flow, each of said blocking grid circuits having a second and substantially infinite load impedance value at which, for second respectively different values of control grid-cathode potential and second respective values of blocking grid-cathode potential, the respective blocking grids will each assume a blocked condition thereof in which it permits the flow of its respective portion of anode current flow in an amount substantially independent of further negative excursions of control grid-cathode potential, an electron emitting element forming an extension of said cathode, a plurality of secondarily emissive rod-like elements disposed about the extension of said cathode and each forming an extension of a respective one of said blocking grid electrodes, and a fluorescent target arranged about said rod-like extensions.

6. A counting and indicating device comprising a cathode, a control grid disposed about said cathode, an anode disposed about said control grid, a plurality of secondarily emissive rod-like blocking grid electrodes disposed between the control grid and the anode and each being included in a respective circuit having a different first effective load impedance value at which, for first predetermined values of control grid-cathode potential and first respective predetermined values of blocking grid-cathode potential, the respective blocking grids will assume a normal unblocked condition thereof in which each blocking grid substantially suppresses a respective portion of anode current flow, each of said blocking grid circuits having a second and substantially infinite load impedance value at which, for second respectively different values of control grid-cathode potential and second respective values of blocking grid-cathode potential, the respective blocking grids will each assume a blocked condition thereof in which it permits the flow of its respective portion of anode current flow in an amount substantially independent of further negative excursions of control grid-cathode potential, an electron emitting element forming an extension of said cathode, a plurality of secondarily emissive rod-like elements disposed about the extension of said cathode and each forming an extension of a respective one of said blocking grid electrodes, and a fluorescent target arranged about said rod-like extensions and arranged to receive electrons emitted by said extension of said cathode and passed by said extensions of said blocking grid electrodes.

7. A counting and indicating device comprising a cathode, a control grid disposed about said cathode, an anode disposed about said control grid, a plurality of secondarily emissive rod-like blocking grid electrodes disposed between the control grid and the anode and each being included in a respective circuit having a different first effective load impedance value at which, for first predetermined values of control grid-cathode potential and first respective predetermined values of blocking grid-cathode potential, the respective blocking grids will assume a normal unblocked condition thereof in which each blocking grid substantially suppresses a respective portion of anode current flow, each of said blocking grid circuits having a second and substantially infinite load impedance value at which, for second respectively different values of control grid-cathode potential and second respective values of blocking grid-cathode potential, the respective blocking grids will each assume a blocked condition thereof in which it permits the flow of its respective portion of anode current flow in an amount substantially independent of further negative excursions of control grid-cathode potential, an electron emitting element forming an extension of said cathode, a plurality of secondarily emissive rod-like elements disposed about the extension of said cathode, and a fluorescent target disposed about said rod-like extensions and arranged to receive electrons emitted by said extension of said cathode, each of said rod-like extensions being connected to a respective one of said blocking grid electrodes whereby said rod-like elements will suppress current flow between said target and said extension of said cathode when said respective blocking grids are in said unblocked conditions thereof and will permit current flow between said extension of said cathode and portions of said target disposed adjacent to said rod-like elements when said respective blocking grids are in said blocked conditions thereof.

8. An electrical circuit arrangement for indicating the number of voltage pulses applied to an input terminal, each pulse representing an information element, comprising a counting tube having a cathode, a control grid disposed about said cathode, an anode and a plurality of secondarily emissive blocking grid electrodes disposed between said control grid and said anode and each arranged in spaced relationship relative to said control grid and said anode, a plurality of blocking grid circuits each including a respective one of said blocking grid electrodes and each having a different first effective load impedance value at which, for first predetermined values of control grid-cathode potential and first respective predetermined values of blocking grid-cathode potential, the respective blocking grids will assume a normal unblocked condition thereof in which each blocking grid substantially suppresses a respective portion of anode current flow, each of said blocking grid circuits having a second and substantially infinite load impedance value at which, for second respectively different values of control grid-cathode potential and second respective values of blocking grid-cathode potential, the respective blocking grids will each assume a blocked condition thereof in which it permits the flow of its respective portion of anode current flow in an amount substantially independent of further negative excursions of control grid-cathode potential, means responsive to application of successive ones of said voltage pulses to said input terminal successively to cause said blocking grids to assume said blocked conditions thereof thereby successively to permit flow of said respective portions of said anode current, means operative upon assumption of said blocked condition by all of said plurality of blocking grid electrodes to cause said plurality of blocking grid electrodes to assume said unblocked conditions thereof, and means responsive to variations in said anode current produced as said blocking grid electrodes successively assume said blocked conditions thereof to indicate the number of voltage pulses applied to said input terminal.

9. An electrical circuit arrangement for indicating the number of voltage pulses applied to an input terminal, each pulse representing an information element, comprising a counting tube having a cathode, a control grid disposed about said cathode, an anode and a plurality of secondarily emissive rod-like blocking grid electrodes disposed between said control grid and said anode and each arranged in spaced relationship relative to said control grid and said anode, a plurality of blocking grid circuits each including a respective one of said blocking grid electrodes and each having a different first effective load impedance value at which, for first predetermined values of control grid-cathode potential and first respective predetermined values of blocking grid-cathode potential, the respective blocking grids will assume a normal unblocked condition thereof in which each blocking grid substantially suppresses a respective portion of anode current flow, each of said blocking grid circuits having a second and substantially infinite load impedance value at which, for second respectively different values of control grid-cathode potential and second respective values of blocking grid-cathode potential, the respective blocking grids will each assume a blocked condition thereof in which it permits the flow of its respective portion of anode current flow in an amount substantially independent of further negative excursions of control grid-cathode potential, means responsive to application of successive ones of said voltage pulses to said input terminal successively to cause said blocking grids to assume said blocked conditions thereof thereby successively to permit flow of said respective portions of said anode current, means responsive to the flow of said respective portions of said anode current successively to produce said second predetermined values of control grid-cathode potential, means operative upon assumption of said blocked condition by all of said plurality of blocking grid electrodes to cause said plurality of blocking grid electrodes to assume said unblocked conditions thereof, and means responsive to variations in said anode current produced as said blocking grid electrodes successively assume said blocked conditions thereof to indicate the number of voltage pulses applied to said input terminal.

10. An electrical circuit arrangement for indicating the number of voltage pulses applied to an input terminal, each pulse representing an information element, comprising a counting tube having a cathode, a control grid disposed about said cathode, an anode and a plurality of secondarily emissive blocking grid electrodes disposed between said control grid and said anode and each arranged in spaced relationship relative to said control grid and said anode, a biasing resistive element intercoupling said cathode and said anode, a plurality of blocking grid circuits each including a respective one of said blocking grid electrodes and each having a different first effective load impedance value at which, for first predetermined values of control grid-cathode potential and first respective predetermined values of blocking grid-cathode potential, the respective blocking grids will assume a normal unblocked condition thereof in which each blocking grid substantially suppresses a respective portion of anode current flow, each of said blocking grid circuits having a second and substantially infinite load impedance value at which, for second respectively different values of control grid-cathode potential and second respective values of blocking grid-cathode potential, the respective blocking grids will each assume a blocked condition thereof in which it permits the flow of its respective portion of anode current flow in an amount substantially independent of further negative excursions of control grid-cathode potential, means responsive to application of successive ones of said voltage pulses to said input terminal successively to cause said blocking grids to assume said blocked conditions thereof thereby successively to permit flow of said respective portions of said anode current, flow of said respective portions of anode current successively producing voltage drops across said biasing resistive element equal to said second predetermined values of control grid-cathode potential, means operative upon assumption of said blocked condition by all of said plurality of blocking grid electrodes to cause said plurality of blocking grid electrodes to assume said unblocked conditions thereof, and means responsive to variations in said anode current produced as said blocking grid electrodes successively assume said blocked conditions thereof to indicate the number of voltage pulses applied to said input terminal.

11. An electrical circuit arrangement for indicating the number of voltage pulses applied to an input terminal, each pulse representing an information element, comprising a counting tube having a cathode, a control grid disposed about said cathode, an anode and a plurality of secondarily emissive blocking grid electrodes disposed between said control grid and said anode and each arranged in spaced relationship relative to said control grid and said anode, an anode-cathode circuit including a biasing resistor and a current meter, a plurality of blocking grid circuits each including a respective one of said blocking grid electrodes and each having a different first effective load impedance value at which, for first predetermined values of control grid-cathode potential and first respective predetermined values of blocking grid-cathode potential, the respective blocking grids will assume a normal unblocked condition thereof in which each blocking grid substantially suppresses a respective portion of anode current flow, each of said blocking grid circuits having a second and substantially infinite load impedance value at which, for second respectively different values of control grid-cathode potential and second respective values of blocking grid-cathode potential, the respective blocking grids will each assume a blocked condition thereof in which it permits the flow of its respective portion of anode current flow in an amount substantially independent of further negative excursions of control grid-cathode potential, means responsive to application of successive ones of said voltage pulses to said input terminal successively to cause said blocking grids to assume said blocked conditions thereof thereby successively to permit flow of said respective portions of said anode current, flow of said respective portions of anode current successively producing voltage drops across said biasing resistor equal to said second predetermined values of control grid-cathode potential, means operative upon assumption of said blocked condition by all of said plurality of blocking grid electrodes to cause said plurality of blocking grid electrodes to assume said unblocked conditions thereof, and means comprising said current meter and responsive to variations in said anode current produced as said blocking grid electrodes successively assume said blocked conditions thereof to indicate the number of voltage pulses applied to said input terminal.

12. An electrical circuit arrangement for indicating the number of negative voltage pulses applied to an input terminal, each negative pulse representing an information element, comprising a counting tube having a cathode, a control grid disposed about said cathode, an anode and a plurality of secondarily emissive blocking grid electrodes disposed in substantially circular formation between said control grid and said anode and each arranged to control a respective portion of the anode current flow of said tube, a plurality of resistance elements each having a different resistance value and each having one end thereof coupled to a respective one of said blocking grid electrodes, conductive means interconnecting the other ends of said plurality of resistive elements, each of said blocking grid electrodes having an unblocked condition in which said blocking grid electrodes suppress their respective portions of said anode current flow and a blocked condition corresponding to predetermined values of control grid-cathode potential and in which said blocking grid electrodes permit flow of said respective portions of said anode current, means to apply a given positive potential to said conductive means, means to apply a positive potential higher than said given potential to said anode, means to couple said input terminal to said control grid whereby application of successive negative pulses to said input terminal causes said blocking grids successively to assume said blocked conditions thereof thereby successively to permit flow of said respective portions of said anode current, means operative upon assumption of said blocked condition by all of said plurality of blocking grid electrodes to cause said plurality of blocking grid electrodes to assume said unblocked conditions thereof, and means responsive to variations in said anode current produced as said blocking grid electrodes successively assume said blocked conditions thereof to indicate the number of negative voltage pulses applied to said input terminal.

13. An electrical circuit arrangement for indicating the number of negative voltage pulses applied to an input terminal, each negative pulse representing an information element, comprising a counting tube having a cathode, a control grid disposed about said cathode, an anode and a plurality of secondarily emissive blocking grid electrodes disposed in substantially circular formation between said control grid and said anode and each arranged to control a respective portion of the anode current flow of said tube, a biasing resistor intercoupling said cathode and said anode, a plurality of resistance elements each having a different resistance value and each having one end thereof coupled to a respective one of said blocking grid electrodes, conductive means interconnecting the other ends of said plurality of resistive elements, each of said blocking grid electrodes having an unblocked condition in which said blocking grid electrodes suppress their respective portions of said anode current flow and a blocked condition corresponding to predetermined values of control grid-cathode potential and in which said blocking grid electrodes permit flow of said respective portions of said anode current, means to apply a given positive potential to said conductive means, means to apply a positive potential higher than said given potential to said anode, means to couple said input terminal to said control grid whereby application of successive negative pulses to said input terminal causes said blocking grids successively to assume said blocked conditions thereof thereby successively to permit flow of said respective portions of said anode current, flow of said respective portions of said anode current through said biasing resistor producing successive voltage drops thereacross equal, respectively, to said predetermined values of control grid-cathode potential, means operative upon assumption of said blocked condition by all of said plurality of blocking grid electrodes to cause said plurality of blocking grid electrodes to assume said unblocked conditions thereof, and means responsive to variations in said anode current produced as said blocking grid electrodes successively assume said blocked conditions thereof to indicate the number of negative voltage pulses applied to said input terminal.

14. An electrical circuit arrangement for indicating the number of negative voltage pulses applied to an input terminal, each negative pulse representing an information element, comprising a counting tube having a cathode, a control grid disposed about said cathode, an anode and a plurality of secondarily emissive blocking grid electrodes disposed in substantially circular formation between said control grid and said anode and each arranged to control a respective portion of the anode current flow of said tube, a biasing resistor and a current meter connected in series and intercoupling said cathode and said anode, a plurality of resistance elements each having a different resistance value and each having one end thereof coupled to a respective one of said blocking grid electrodes, conductive means interconnecting the other ends of said plurality of resistive elements, each of said blocking grid electrodes having an unblocked condition in which said blocking grid electrodes suppress their respective portions of said anode current flow and a blocked condition corresponding to predetermined values of control grid-cathode potential and in which said blocking grid electrodes permit flow of said respective portions of said anode current, means to apply a given positive potential to said conductive means, means to apply a positive potential higher than said given potential to said anode, means to couple said input terminal to said control grid whereby application of successive negative pulses to said input terminal causes said blocking grids successively to assume said blocked conditions thereof thereby successively to permit flow of said respective portions of said anode current, flow of said respective portions of said anode current through said biasing resistor producing successive voltage drops thereacross equal, respectively, to said predetermined values of control grid-cathode potential, means operative upon assumption of said blocked condition by all of said plurality of blocking grid electrodes to cause said plurality of blocking grid electrodes to assume said unblocked conditions thereof, and means including said current meter and responsive to variations in said anode current produced as said blocking grid electrodes successively assume said blocked conditions thereof to indicate the number of negative voltage pulses applied to said input terminal.

15. An electrical circuit arrangement for indicating the number of positive pulses applied to an input terminal, each positive pulse representing an information element, comprising a counting tube having a cathode, a control grid disposed about said cathode, an anode and a plurality of secondarily emissive rod-like blocking grid electrodes disposed in substantially spiral formation between said control grid and said anode and each arranged to control a respective portion of the anode current flow of said tube, a plurality of capacitive elements each having one end thereof coupled to a respective one of said blocking grid electrodes, conductive means interconnecting the other ends of said plurality of capacitive elements, each of said blocking grid electrodes having an unblocked condition in which said blocking grid electrodes suppress their respective portions of said anode current flow and a blocked condition corresponding to predetermined values of control grid-cathode potential and in which said blocking grid electrodes permit flow of said respective portions of said anode current, means to apply a positive potential to said anode, means intercoupling said input terminal and said conductive means whereby application of succesive positive pulses to said input terminal causes said blocking grids successively to assume said blocked conditions thereof thereby successively to permit flow of said respective portions of said anode current, means operative upon assumption of said blocked condition by all of said plurality of blocking grid electrodes to cause said plurality of blocking grid electrodes to assume said unblocked conditions thereof, and means responsive to variations in said anode current produced as said blocking grid electrodes successively assume said blocked conditions thereof to indicate the number of voltage pulses applied to said input terminal.

16. An electrical circuit arrangement for indicating the number of positive voltage pulses applied to an input terminal, each positive pulse representing an information element, comprising a counting tube having a cathode, a control grid disposed about said cathode, an anode and a plurality of secondarily emissive rod-like blocking grid electrodes disposed in substantially spiral formation between said control grid and said anode and each arranged to control a respective portion of the anode current flow of said tube, a plurality of capacitive elements each having one end thereof coupled to a respective one of said blocking grid electrodes, conductive means interconnecting the other ends of said plurality of capacitive elements, each of said blocking grid electrodes having an unblocked condition in which said blocking grid electrodes suppress their respective portions of said anode current flow and a blocked condition corresponding to predetermined values of control grid-cathode potential and in which said blocking grid electrodes permit flow of said respective portions of said anode current, means to apply a positive potential to said anode, means intercoupling said input terminal and said conductive means whereby application of successive positive pulses to said input terminal causes said blocking grids successively to assume said blocked conditions thereof thereby successively to permit flow of said respective portions of said anode current, means comprising a capacitive element intercoupling the last one of said blocking grid electrodes to assume said blocked condition and said control grid to cause said plurality of blocking grid electrodes to assume said unblocked conditions thereof, and means responsive to variations in said anode current produced as said blocking grid electrodes successively assume said blocked conditions thereof to indicate the number of voltage pulses applied to said input terminal.

17. An electrical circuit arrangement for indicating the number of negative voltage pulses applied to an input terminal, each negative pulse representing an information element, comprising a counting tube having a cathode, a control grid disposed about said cathode, an anode and a plurality of secondarily emissive blocking grid electrodes disposed in substantially circular formation between said control grid and said anode and each arranged to control a respective portion of the anode current flow of said tube, an electron discharge system having additional cathode, control grid and anode electrodes, a plurality of resistance elements each having a different resistance value and each having one end thereof coupled to a respective one of said blocking grid electrodes, conductive means interconnecting the other ends of said plurality of resistive elements, each of said blocking grid electrodes having an unblocked condition in which said blocking grid electrodes suppress their respective portions of said anode current flow and a blocked condition corresponding to predetermined values of control grid-cathode potential and in which said blocking grid electrodes permit flow of said respective portions of said anode current, means to apply a given positive potential to said conductive means, means to apply a positive potential higher than said given potential to said anode, means to couple said input terminal to said control grid whereby application of successive negative pulses to said input terminal causes said blocking grids successively to assume said blocked conditions thereof thereby successively to permit flow of said respective portions of said anode current, means to couple the last of said blocking grid electrodes to said control grid and to said additional control grid, means intercoupling said cathode and said additional cathode, means intercoupling said additional anode and said conductive means whereby said electron discharge system effectively short-circuits said resistive elements upon assumption of said blocked condition by all of said plurality of blocking grid electrodes.

18. An electrical circuit arrangement as set forth in claim 17 wherein the electron discharge system and the counting tube are enclosed within a single envelope and in which the additional cathode constitutes an extension of the cathode.

References Cited in the file of this patent

UNITED STATES PATENTS

| | | |
|---|---|---|
| 1,683,134 | Hull | Sept. 4, 1928 |
| 2,126,288 | Schlesinger | Aug. 9, 1938 |
| 2,189,318 | Krenzien | Feb. 6, 1940 |
| 2,204,999 | Siebertz | June 18, 1940 |
| 2,225,786 | Langenwalter et al. | Dec. 24, 1940 |
| 2,238,607 | Schnitger | Apr. 15, 1941 |
| 2,246,172 | Hergenrother | June 17, 1941 |
| 2,254,095 | Thompson | Aug. 26, 1941 |
| 2,265,746 | Sandhagen | Dec. 9, 1941 |
| 2,473,159 | Lyman | June 14, 1949 |
| 2,494,670 | Rajchman | Jan. 17, 1950 |
| 2,524,213 | Wales | Oct. 3, 1950 |
| 2,533,401 | Schramm | Dec. 17, 1950 |
| 2,638,541 | Wallmark | May 12, 1953 |